United States Patent Office 3,381,871
Patented May 7, 1968

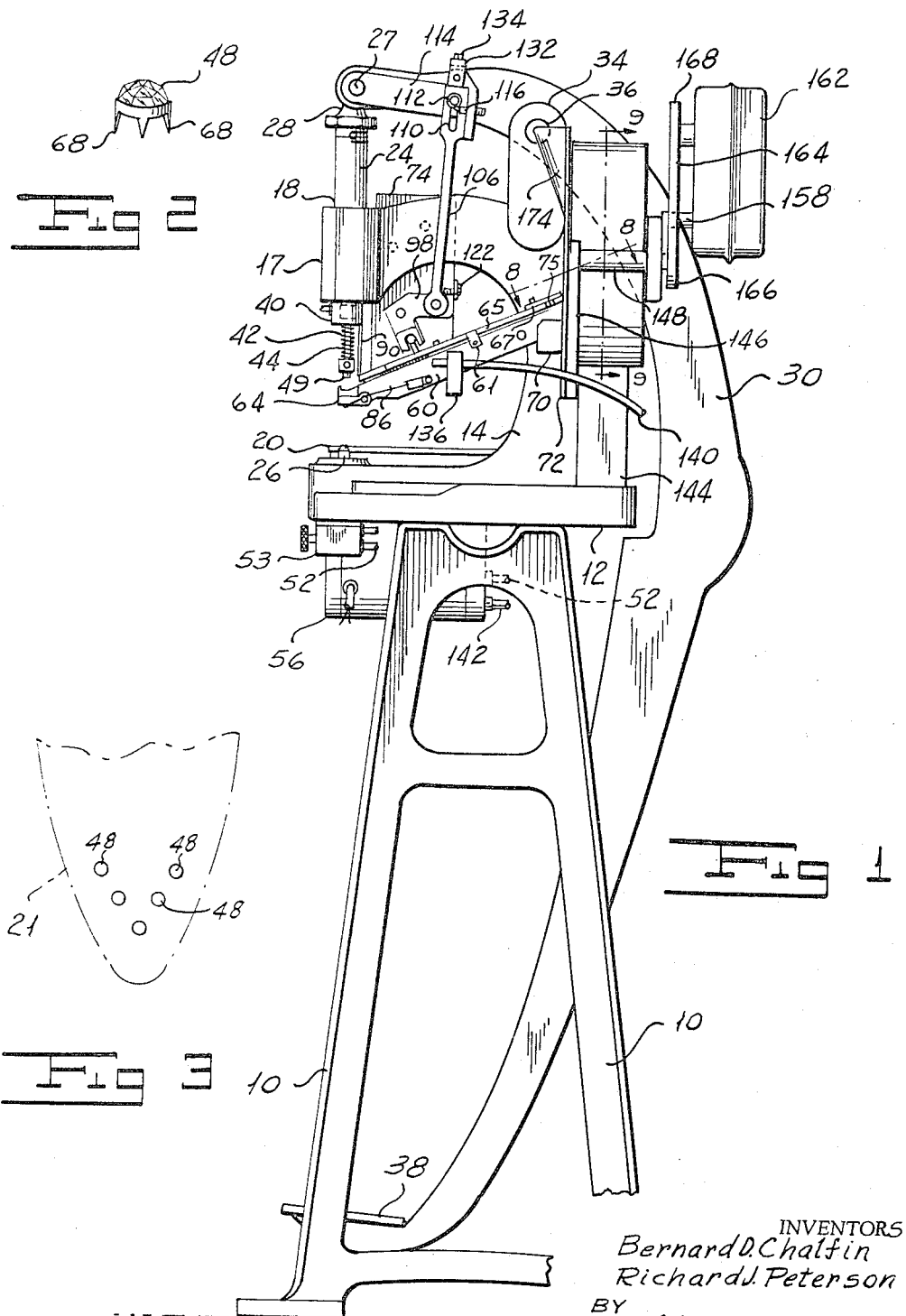

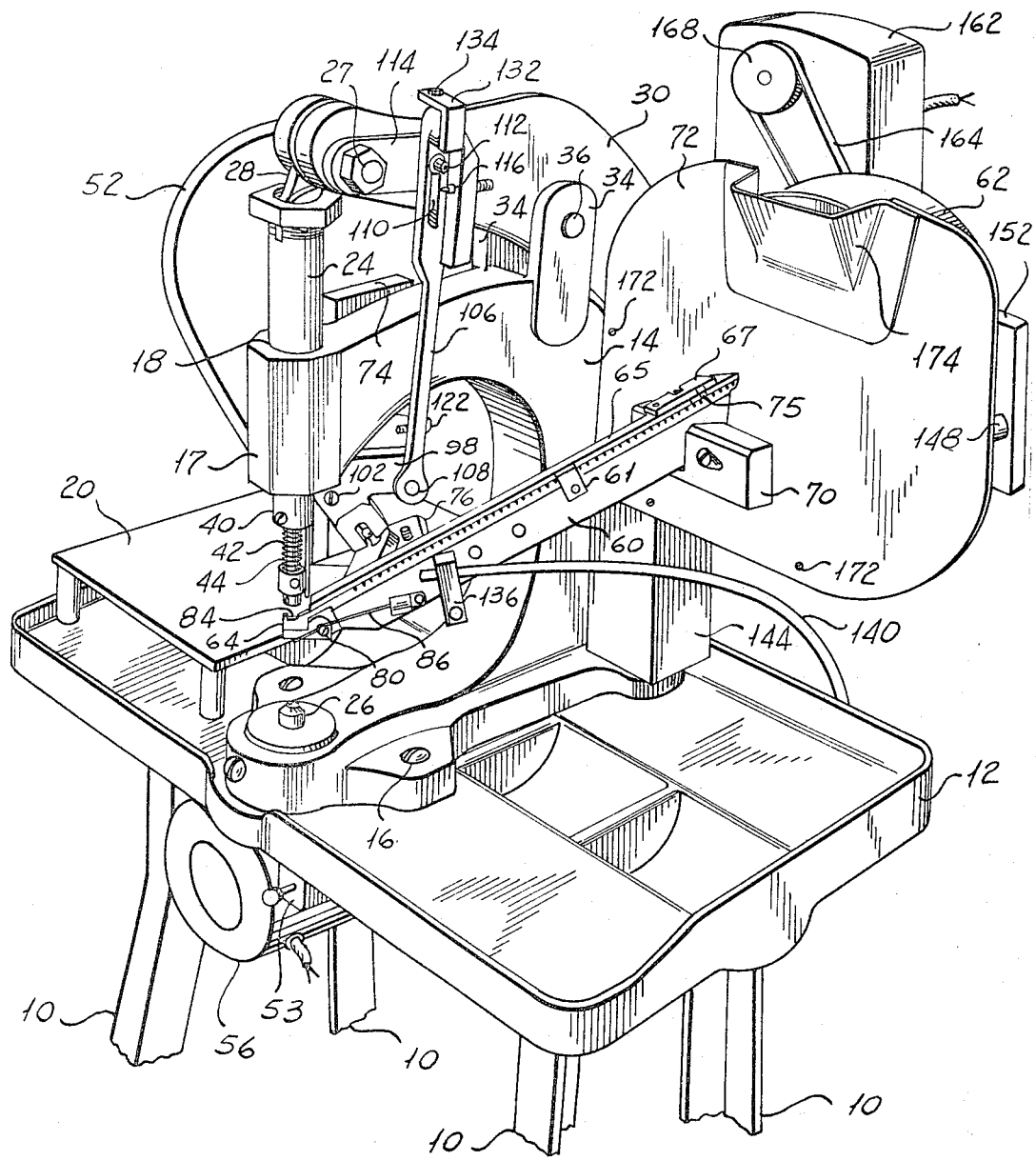

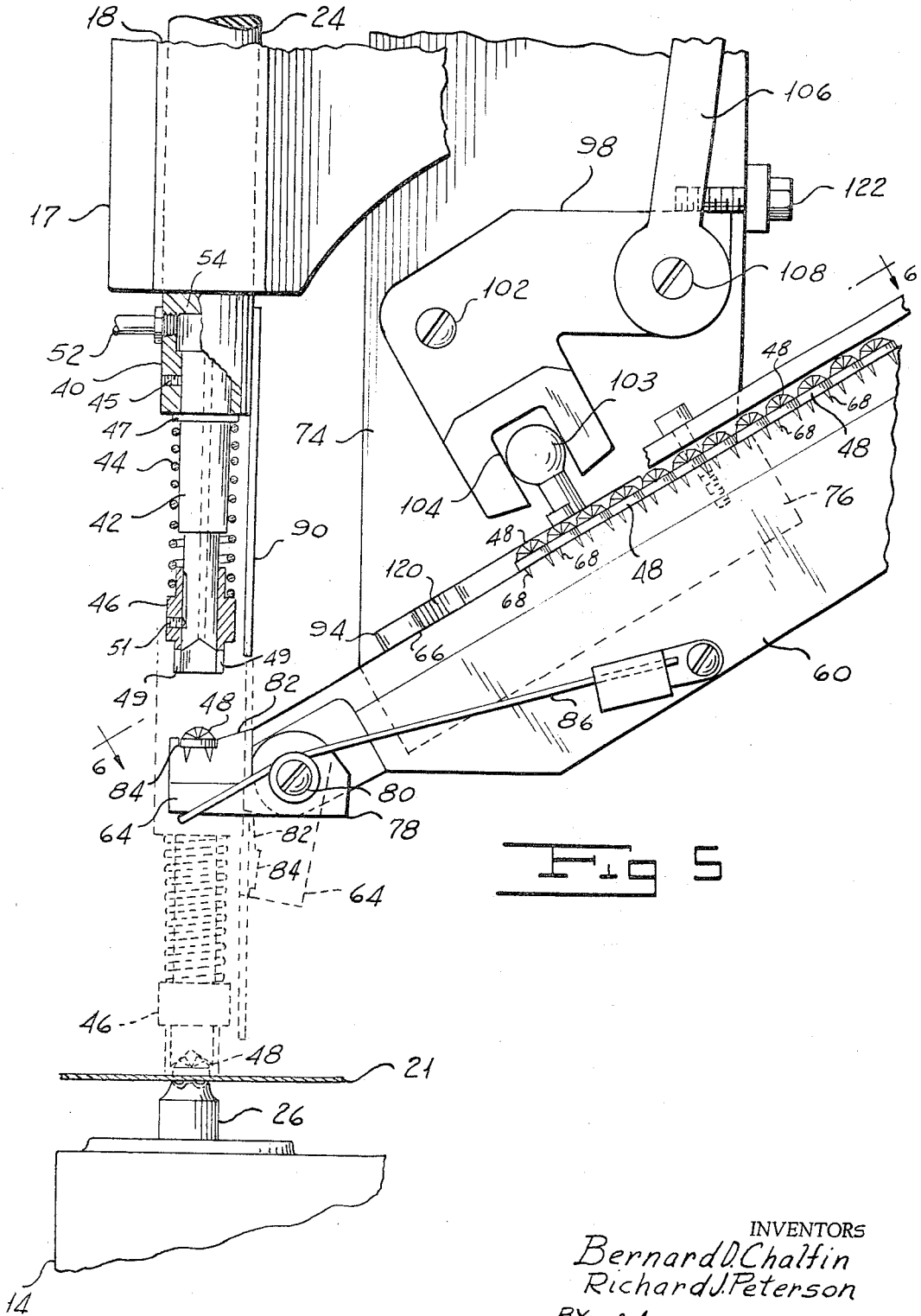

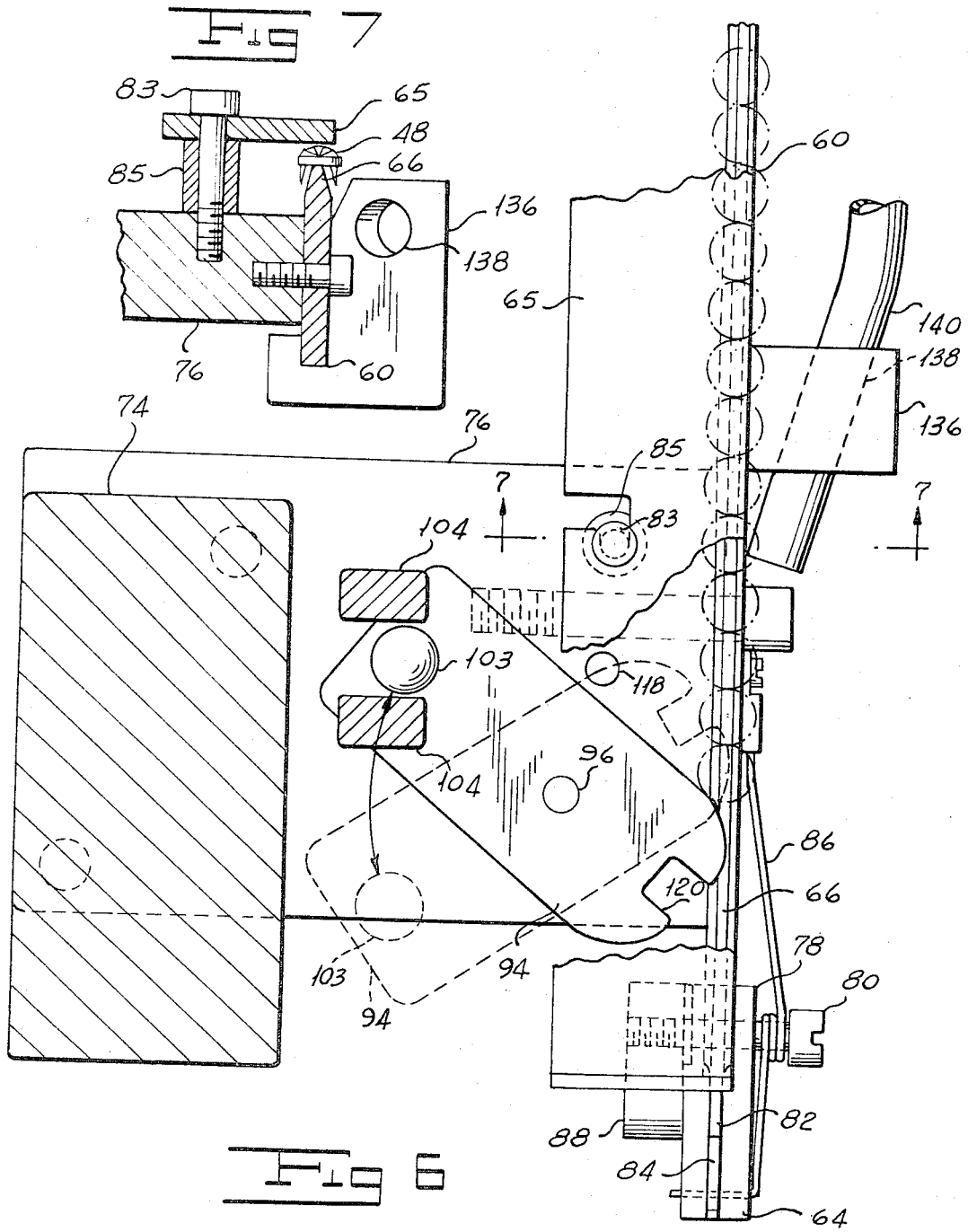

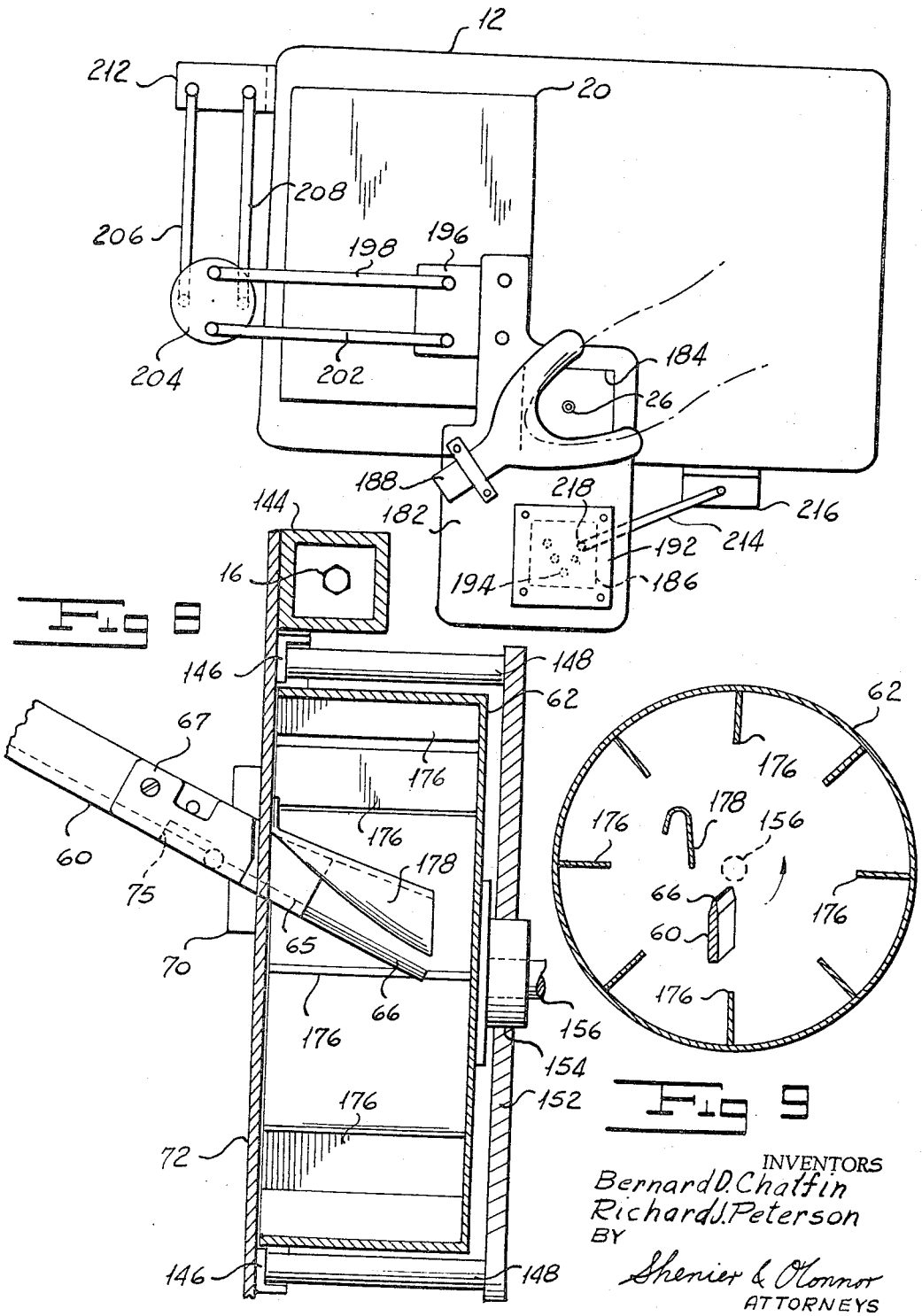

3,381,871
TRIMMING MACHINE
Bernard D. Chalfin, Tenafly, and Richard J. Peterson, Paramus, N.J., assignors to C. & C. Button & Trimming Co., Inc., New York, N.Y., a corporation of New York
Filed Oct. 23, 1965, Ser. No. 503,663
18 Claims. (Cl. 227—118)

ABSTRACT OF THE DISCLOSURE

Apparatus for automatically applying pronged decorative elements of material in which the elements are tumbled by vanes in a rotating hopper onto an inclined ramp along which they slide to an escapement lever which feeds them one by one to a pivoted holder, which supports an element in a position between a reciprocating ram and an upsetting die over which the work is placed. A vacuum pump connected to an axial bore in the ram produces a reduced pressure within a movable sleeve on the end of the ram to permit the ram to pick up an element from the holder and then drive the element prongs through the work and into the upsetting die. A parallel motion work-holding frame and template arrangement advantageously facilitates attaching the elements to the material in a predetermined pattern.

---

Our invention relates to the trimming machine for fastening pronged objects to material in a rapid and expeditious manner and, more particularly, to an improved machine which is easy to operate, simple and reliable.

Ornamental beads, buttons, rhinestones and other objects are commonly fastened to soft goods such as leather by means of teeth or prongs extending from the object itself or from a setting in which the object is secured. The prongs are driven through the material and upset or clinched in order to secure the object thereto.

In the art of timming articles of wearing apparel, such as ladies' dresses, sweaters, shoes and the like, a large number of decorative elements may be applied to a single garment. Moreover, often the elements are arranged in a complicated pattern. Various machines are known in the prior art for feeding pronged elements to a location at which they are attached to the article in response to an actuation of the machine by an operator. The quality of the work produced and the cost to the manufacturer are determined largely by the skill of the operator.

Trimming machines of the prior art are not satisfactory in that they require relatively skilled operators. If attempts are made to operate these machines at a relatively high rate, they have a tendency to jam. They are relatively complicated in construction for the limited capability thereof. Their operation is complex and unreliable. Then too, with machines of the prior art, ornaments cannot be rapidly and accurately secured in a predetermined pattern on the material.

We have invented an improved machine which is simple in construction and reliable in operation. It is capable of high speed operation by a relatively unskilled operator. With our improved machine an unskilled operator can rapidly affix the ornaments in a predetermined pattern.

One object of our invention is to provide an improved trimming machine which is simple in construction and reliable in operation.

Another object of our invention is to provide an improved trimming machine which is capable of high speed operation as compared to the machines of the prior art.

Still another object of our invention is to provide an improved trimming machine which can be satisfactorily operated by an unskilled operator.

A further object of our invention is to provide an improved machine with which pronged objects can be rapidly and accurately affixed in a predetermined pattern.

Other and further objects of our invention will appear from the following description.

In general our invention contemplates the provision of an improved trimming machine in which pronged elements are tumbled by vanes in a rotating hopper to an inclined ramp along which they slide to an escapement mechanism which positively feeds them to a pivoted holder which supports an element in an upright position between a reciprocating ram and an upsetting die over which the work is placed. A vacuum pump connected to the interior of an axial bore open at the lower end of the ram produces a reduced pressure by virtue of which the ram, as it descends, first picks the element from the holder while pivoting the holder and then drives the element prongs through the work and into the upsetting die.

Advantageously we provide our machine with a parallel motion work-holding frame and template arrangement to facilitate the operation of forming a pattern of elements on the work.

In the accompanying drawings which form part of the instant specification and which are to be read in conjunction therewith and in which like reference numerals are used to indicate like parts in the various views:

FIGURE 1 is a side elevation of one embodiment of our improved trimming machine.

FIGURE 2 is a perspective view of one type of ornament which our new machine is adapted to secure to various materials.

FIGURE 3 is a plan view of a pattern of ornaments secured, for example, to a shoe upper which is indicated by phantom lines.

FIGURE 4 is a perspective view of the machine shown in FIGURE 1 with parts broken away.

FIGURE 5 is a fragmentary side elevation illustrating details of the machine shown in FIGURE 1.

FIGURE 6 is a sectional view of our improved trimming machine taken along the line 6—6 of FIGURE 5.

FIGURE 7 is a sectional view of our improved trimming machine taken along the line 7—7 of FIGURE 6.

FIGURE 8 is a sectional view of our improved trimming machine taken along the line 8—8 of FIGURE 1 and drawn on an enlarged scale.

FIGURE 9 is a sectional view of our improved trimming machine taken along the line 9—9 of FIGURE 1 and drawn on an enlarged scale.

FIGURE 10 is a top plan view of an embodiment of our pattern-forming mechanism.

More particularly, referring now to FIGURES 1, 4 and 5 of the drawings, bolts 16 secure a C-frame 14 to a bed 12 supported on legs 10. A cylindrical bore 18, extending through an enlarged region 17 in the upper leg of C-frame 14, forms a guide for a ram 24, which is adapted to reciprocate toward and away from a clinching anvil or upsetting die 26 which is secured to the lower leg of the C-frame. Preferably, anvil 26 is screwed into frame 14 in order to facilitate its replacement in the event of wear or in the event it is not suited to clinch the prongs of a particular ornament. We provide a work table 20 resting on or secured to bed 12. The upper surface of table 20 is approximately flush with the top of anvil 26.

One end of a link 28 is pivotally connected to the upper end of ram 24. A pin 27 pivotally connects the other end of link 28 to one end of an operating lever 30 at the other end of which we provide a foot pedal 38. A pair of upstanding arms 34 on the frame 14 form a bracket carrying a pin 36 which pivotally supports the lever 30. It will be appreciated that movement of pedal 38 toward the right in FIGURE 1 causes ram 24 to move downwardly toward anvil 26 and movement toward the left causes ram 24 to move upwardly away from the anvil.

A setscrew 45 secures the punch 42 to a cylindrical housing 40, which is secured to the ram 24 in any suitable manner. A coiled compression spring 44 bearing between a flange 47 on punch 42 and an element-receiving collar 46 slidably mounted on the lower part of the punch by a setscrew 51 riding on a flat in the side of the punch normally urges the collar 46 to a limit position determined by the engagement of screw 51 with the lower end of the flat.

We connect one end of a vacuum hose 52 by means of a suitable vacuum fitting known in the art to a port 54 formed in the wall of housing 40. A cut off valve 53 connects the other end of the hose 52 to a vacuum pump 56, which is bolted to the underside of bed 12. Valve 53 is secured to the bed 12 in a position at which its operating handle is readily accessible to the machine operator. The pump 56 provides a sufficient reduction of pressure within tube 42 to hold an ornament, such as the ornament 48 of FIGURE 2, to the end of tube 42 by suction. In the event an ornament is broken and becomes lodged in the tube 40, the operator can quickly relieve suction by means of valve 53 and remove the ornament.

Referring now to FIGURES 1 and 4 to 9, an inclined ramp 60 feeds ornaments from a rotatable, elevated hopper 62 to a pivoted holder 64 disposed between the end of tube 42 and anvil 26. We bevel the upper edge of ramp 60 to form a knife edge or narrow rail 66 straddled by the prongs 68 of the ornament setting. The ramp 60 extends into the hopper 60 and the ornaments are tumbled onto the edge 66 in a manner which will be described in detail hereinafter. We mount a retainer plate 65 over the edge 66 on bracket 61 to prevent the ornaments from falling from the ramp 60. An access opening 75 in plate 65 permits the removal of jammed settings from the ramp. A small pivoted cover 67 normally closes this opening.

A block 70 secured to a hopper cover plate 72 supports the upper end of the ramp 60. An L-shaped support, the horizontal leg 76 of which is secured to the ramp and the vertical leg 74 of which is secured to the C-frame, supports ramp 60 adjacent its lower end. If desired, the lower end of retainer plate 65 may be secured to leg 76 by means of a bolt 83 and a spacer 85. The upper surface of leg 76 is parallel to the edge 66 of the ramp.

A pin 80 passing through aligned bores in the ramp 60 and in bifurcations 78 on holder 64 pivotally secures the holder to the end of the ramp. The holder 64 has a narrow beveled edge 82 in which we cut a notch 84 adapted to catch and seat an ornament with its prongs extending in the direction of the anvil 26. A coil spring 86 on pin 80 has legs which respectively engage the underside of holder 64 and a fitting on ramp 60 normally urges the holder in a clockwise direction as viewed in FIGURE 5 to a limit position at which the end of edge 82 abuts the end of edge 66 of the ramp. In that position of the holder edges 66 and 82 form an uninterrupted path for the elements. We mount a cam 88 on pin 80 beneath a rod 90 which is secured to housing 40 in a suitable manner known in the art, such as welding. When ram 24 descends the end of sleeve 46 moves down over the element 48 which is retained in the tube end by atmospheric pressure acting against the reduced pressure within the bore of the punch. When the element is thus securely engaged, rod 90 strikes cam 88 to pivot holder 64 out of the path of movement of the punch 42 and sleeve 46. Aligned slots 49 in the lower end of the sleeve wall permit the tube to engage the element 48 without striking edge 82.

Referring now to FIGURES 4 to 6, in order to feed ornaments to holder 64 one at a time we provide an escapement lever 94 rotatably mounted on leg 76 by means of a pin 96. A pin 102 pivotally mounts a bell crank 98 on leg 74. A slot 104 in one arm of crank 98 engages an upstanding spherical lug 103 on escapement lever 98. A pin 108 pivotally connects the other end of crank 98 to the lower end of a connecting rod 106. We provide the upper end of rod 106 with a slot 110 which slidably receives a pin 112 carried by a spacer 114 mounted on pin 27. A spring-loaded detent 116 positioned along the length of the slot 110 is adapted to be engaged by pin 112 to provide a driving connection between lever 30 and rod 106. Detent 116 is so positioned as to provide the correctly timed relationship between the reciprocation of ram 24 and the operation of the escapement to be described. The detent 116 is tapered and spring-biased so as to extend into a position at which it can be engaged by pin 112. When pin 112 moving in slot 110 contacts the tapered detent 116, it will drive rod 106 until an element to be described, which is carried thereby, engages a positive stop. When that occurs, the pin 112 rides past detent 116 against the action of its biasing spring (not shown). Pin 112 then continues to ride in the slot 110. Upon reversal of the direction of movement of pin 112, the same action takes place with the movement of rod 106 being reversed until another stop is reached, at which time pin 112 will ride past the detent 116.

As the operating lever 30 moves counterclockwise as viewed in FIGURE 1, pin 112 engages detent 116 to drive rod 106 downwardly. Rod 106, in turn, rotates bell crank 102 in a clockwise direction to move escapement lever 94 in a counterclockwise direction until it strikes a stop 118. In this position of lever 94 shown in broken lines in FIGURE 6, an ornament 48 slides into a notch 120 in the end of escapement lever 94. Following the engagement of lever 94 with stop 118, further movement of lever 30 drives the pin 112 past the detent 116. Upon the return movement of lever 30 after the ornament has been set, pin 112 moves upwardly and engages detent 116, driving lever 106 upwardly. In the course of this movement of lever 106, it rotates bell crank 102 in a counterclockwise direction, driving escapement lever 94 in a clockwise direction until the arm of the bell crank 98 engages a stop screw 122 on leg 74. The corresponding position of the escapement lever 94 is shown in full lines in FIGURE 6. The movement of the escapement lever just described propels the element 48 out of notch 120 and down onto holder 64. The toe of the lever 94 during the return stroke engages the lowermost element 48 and moves all elements on the ramp upwardly. This will clear any jam of elements passing from the hopper onto the narrow edge 66 exposed within the hopper. It should be noted that detent 116 is not engaged by roller 112 until after the end of tube 40 clears holder 64 and spring 86 returns the holder to the position at which it can receive the next element. Following the engagement of crank 98 with stop 122 and upon further movement of lever 30 in its return stroke, pin 112 rides upwardly past detent 116. At the completion of the return stroke of operating lever 30, the upper edge of spacer 114 engages a pin 134 on a bracket 132 on rod 106 positively to hold crank 98 against stop 122.

Referring to FIGURES 1, 4, 6 and 7, a block 136, which is secured to the side of ramp 60, has an oblique bore 138 formed therein which supports one end of a hose 140, the other end 147 of which is connected to the discharge side of vacuum pump 56. Bore 138 so orients the end of hose 140 that a stream of air issuing therefrom assists in feeding elements 48 along ramp 60 and into notch 120. It further aids in moving elements from the notch to the holder 64.

Referring to FIGURES 1, 4, 8 and 9, a column 144 carrying a U-shaped frame 146 is secured to a flange on frame 14 by means of a bolt 16 or the like. Spacer rods 148 secured to frame 146 support a plate 152 which is secured thereto in a suitable manner known in the art. Plate 152 carries a bearing 154 which rotatably supports a shaft 156 on which the hopper 62 is mounted. A bracket 158 on plate 152 supports the hopper drive system 162. The output shaft of motor 162 drives a pulley 168 to drive a belt 164 engaging a pulley 166 on shaft 156.

Preferably the electric motor drive unit 162 drives the hopper 62 at about 38 r.p.m. The cover plate 72 of the hopper unit has a spout shaped inlet 174 through which ornaments may be fed to hopper 62. Any suitable means, such as screws 172, secure plate 72 to frame 146.

Referring now particularly to FIGURES 8 and 9, we provide eight equally spaced, radially directed vanes or paddles 176 around the periphery of hopper 62 for tumbling the ornaments. The ramp 60 passes through an opening in the cover plate 72 and extends a substantial distance into the hopper 62. The plate 65 also passes through the opening in the cover plate 72 but extends only a short distance into the hopper 62, thus exposing a portion of the narrow edge 66.

As the hopper 62 rotates, paddles 176 lift the ornaments therein and tumble them onto the exposed portion of the narrow edge 66. The prongs of certain ones of the ornaments straddle the narrow edge 66 and slide down the ramp. We secure a flexible baffle 178 to cover 72 to assist in directing the ornaments onto the narrow edge and prevent the ornaments from being thrown past the edge as the hopper empties and its speed increases.

FIGURE 10 shows a mechanism which may be used in conjunction with our machine for rapidly and accurately affixing ornaments in a predetermined pattern, such as the V-shaped pattern of ornaments affixed to the shoe upper shown in FIGURE 3. A plate 182 has two rectangular openings 184 and 186 formed therein. A work holder 188 secured to the plate 182 is adapted to hold the material to be trimmed over the opening 184 in a predetermined position. We mount a removable template 192 over opening 186. The underside of template 192 has recesses arranged in the desired pattern.

Plate 182 is removably affixed to a plate 196 which conveniently rests on the worktable 20. The removability enables us readily to replace the plate 182 with a different plate to accommodate various types, sizes and shapes of work. We pivotally connect a first pair of parallel rods to plate 196 and to a connecting plate 204. A second pair of parallel rods 206 and 208 pivotally connect plate 204 to a bracket 212 on frame 12. This arrangement ensures parallel motion of plate 182 with respect to the bed 12.

We affix one end of a rod 214 to a block 216 which is secured to the bed 12. A locating pin 218 at the other end of rod 214 is adapted to engage holes 194 in template 192. Owing to the parallel motion arrangement described above, as the pin 218 moves from recess-to-recess opening 184 and the material supported thereover by work holder 188 move correspondingly with respect to upsetting die 26. It will readily be appreciated that in the course of the operation just described, the support 182 is the member which is moved so as to locate the pin 218 in the various recesses 194. As a result successive operations of the machine produce a pattern of elements 48 in the work corresponding to the pattern of recesses 192 in the template.

In operation of our apparatus to form a pattern of elements 48 on an article, the operator first places the work between work holder 188 and plate 182 and energizes the pump and hopper motors. The operator inserts pin 218 in the first hole 194 of the template 192. As the hopper 62 rotates, ornaments fall onto the narrow edge 66 and slide down ramp 60 to the escapement lever 94 which blocks further movement thereof. If there is initially no ornament on holder 64, one can advantageously be placed thereon by hand. The operator pushes the foot pedal 38 rearwardly causing ram 24 to descend towards anvil 26. The kicker rod 90 contacts cam 88 and rotates holder 64 clear of the downwardly moving tube 40 as the ornament is picked from the pedestal held by suction at the end of tube 40. Ram 24 continues moving downwardly driving the prongs 68 through the material 21 and onto the anvil 26 which upsets them. In the course of the attaching operation sleeve 46 receives the element 48 and ensures correct positioning of its prongs or legs 58 as they are moved into engagement with the die. As this occurs sleeve 46 moves upwardly relative to the punch 42.

As ram 24 moves downwardly, escapement lever 94 is rotated in a counterclockwise direction and an ornament slides into notch 120. After the ornament has been affixed to the material, pedal 38 moves forwardly raising ram 24. As the bar 90 moves free of cam 88 and spring 86 urges the holder 64 into position to receive an ornament, pin 112 engages detent 116 and rod 106 operates bell crank 98 to rotate escapement lever 94 in a clockwise direction to propel the ornament in notch 120 down the ramp and onto the holder 64. The air issuing from the end of hose 140 assists in moving the ornament onto the pedestal. When the ram 24 is returned to its original position, the operator moves the plate 182 relative to the fixed peg 218 to bring the next hole 194 in the template in alignment with the peg and repeats the above described operation.

It will be appreciated, of course, that the material can be positioned in the machine without the aid of our parallel motion mechanism. Such a procedure would be followed where no premarked or precise pattern need be formed.

Thus it will be seen that we have accomplished the objects of our invention. Our improved machine is simple, economical and reliable in operation. We have provided a machine which can be operated extremely rapidly without danger of jamming. It can readily be operated by a relatively unskilled worker. We have provided our machine with means for facilitating the formation of an accurate pattern.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for securing elements from a supply to a material at an assembly station including in combination, an escapement, means moving said escapement between a first position at which it receives an element from said supply and a second position at which it delivers an element to said assembly station, assembling means at said assembly station operable with an assembling stroke and with a return stroke, and common operating means including a positive two-way lost motion connection to said escapement for concomitantly operating said assembling means with its return stroke while moving said escapement from its first position to its second position and for concomitantly operating said assembling means with its assembling stroke while moving said escapement from its second position to its first position.

2. Apparatus as in claim 1 including a ramp extending from said supply toward said escapement, means at said supply for feeding elements to said ramp to provide a line of elements adapted to slide along said ramp, said escapement comprising an escapement lever having an open-ended longitudinally extending slot in an end thereof adapted to receive an element from said ramp, means mounting said lever for oscillating movement around an axis adjacent said ramp between said first position and said second position, said slot extending inwardly from said end toward said axis, said lever lifting said line as it moves from said second position to said first position and then propelling a received element along said ramp toward said receiving zone as it moves from said first position to said second position.

3. Apparatus for securing elements from a supply to a material at an assembly station including in combination, a ram, means mounting said ram for movement toward and away from said station, vacuum means for receiving and releasably retaining an element on said ram, a holder for receiving an element from said supply, means mounting said holder for pivotal movement in the path of said ram to permit said ram to pick an element from said holder and move it to said assembly station, escapement means for feeding elements to said holder, and common operating means for moving said ram and for actuating said escapement in synchronized relationship.

4. Apparatus as in claim 3 in which said common operating means includes an actuatable member and a two-way lost motion connection between said member and said escapement.

5. Apparatus as in claim 3 in which said feeding means comprises pneumatic means and including common means for providing reduced pressure for said vacuum means and for providing positive pressure for said pneumatic means.

6. Apparatus as in claim 3 in which said escapement comprises a lever adapted to receive an element, means mounting said lever for pivoted movement between a position at which it receives an element from the supply and a position at which it moves the element toward said holder, respective stops for limiting the movement of said lever to said positions and in which said operating means comprises an actuatable member, a pin reciprocated in response to movement of said member, a connecting rod having a slot for receiving said pin and a spring-loaded detent along the length of said slot for engagement by said pin to provide a two-way lost motion connection.

7. In apparatus for applying elements from a supply at an assembly station spaced from said supply, a vacuum holder for moving an element from a pick-up location to said assembly station, means comprising pneumatic means for feeding elements from said supply to said pick-up location and common means providing reduced pressure for said vacuum holder and positive pressure for said pneumatic means.

8. A machine for affixing objects to material comprising in combination, a ram, means for reciprocating said ram along a path, means for producing a pressure gradient for securing one of said objects to the ram by suction, a movable holder for supporting an object, means for moving said holder between a position in said path and a position clear of said path and means for feeding one of said objects to said holder.

9. A machine for affixing pronged objects to a material comprising in combination, a ram, means for clinching the prongs of said objects, means for moving said ram along the path toward and away from said clinching means, means for producing a pressure gradient for retaining one of said objects on the ram by suction, a movable holder for supporting one of said objects with its prongs oriented toward said clinching means, means for moving said holder between a position in said path and a position clear of said path, and means for depositing one of the objects on the holder.

10. A machine as in claim 9 wherein said holder comprises a narrow rail which the prongs of the objects are adapted to straddle, and wherein said means for depositing includes a ramp having a narrow rail which the objects are adapted to straddle.

11. A machine as in claim 10 further comprising a rotatable hopper, means for rotating said hopper, said ramp extending into said hopper, and means disposed within said hopper for tumbling ornaments therein onto said ramp with the prongs thereof astride said rail.

12. A machine as in claim 9 wherein said means for depositing includes means for propelling said objects onto said holder one at a time.

13. A machine as in claim 9 wherein said depositing means includes a movable member disposed adjacent said ramp, means for moving said member between a first position in engagement with an object on said ramp to prevent its movement toward the holder and a second position clear of said object and in engagement with the succeeding object on the ramp to prevent its movement toward the holder.

14. A machine as in claim 9 wherein said depositing means includes a movable member disposed adjacent said ramp, said member having means for receiving one of said objects on said ramp, means for moving said member to a position at which it receives one of the objects on the ramp and toward said holder to propel said object toward the holder.

15. A machine as in claim 9 including pneumatic means for propelling ornaments onto said holder.

16. A machine as in claim 8 wherein said means for producing a pressure gradient includes a bore in one end of said ram, an air pump and means for connecting said pump to said bore for drawing air into said bore from said end.

17. A machine as in claim 9 including an element receiving sleeve and means mounting said sleeve on said ram for movement between a position at which it houses an element and a position at which it exposes an element.

18. A machine as in claim 9 including a parallel motion mechanism, a support, means for holding the material on the support, means including said parallel motion mechanism for positioning the material with respect to the ram and means including a template for controlling the parallel motion mechanism.

References Cited

UNITED STATES PATENTS

| | | | |
|---|---|---|---|
| 565,074 | 8/1896 | Goddu | 227—112 |
| 1,400,002 | 12/1921 | Roger | 227—112 X |
| 1,641,743 | 9/1927 | Dawson | 53—306 |
| 2,078,660 | 4/1937 | Gualtiere | 227—118 |
| 2,489,764 | 11/1949 | Effgen | 227—118 |
| 3,126,549 | 3/1964 | Crawford | 227—154 X |

WILLIAM W. DYER, Jr., *Primary Examiner.*

GRANVILLE Y. CUSTER, Jr., *Examiner.*